(12) United States Patent
Papageorgiou et al.

(10) Patent No.: US 10,503,795 B2
(45) Date of Patent: Dec. 10, 2019

(54) METHOD AND SYSTEM FOR MANAGING DATA

(71) Applicant: NEC EUROPE LTD., Heidelberg (DE)

(72) Inventors: Apostolos Papageorgiou, Heidelberg (DE); JaeSeung Song, Seongnam-si (KR); Mischa Schmidt, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 996 days.

(21) Appl. No.: 14/781,042

(22) PCT Filed: Apr. 2, 2014

(86) PCT No.: PCT/EP2014/056574
§ 371 (c)(1),
(2) Date: Sep. 29, 2015

(87) PCT Pub. No.: WO2014/161874
PCT Pub. Date: Oct. 9, 2014

(65) Prior Publication Data
US 2016/0048596 A1 Feb. 18, 2016

(30) Foreign Application Priority Data
Apr. 2, 2013 (EP) ..................... 13161988

(51) Int. Cl.
*G06F 16/30* (2019.01)
*G06F 16/9535* (2019.01)
(Continued)

(52) U.S. Cl.
CPC .......... *G06F 16/9535* (2019.01); *G06F 16/21* (2019.01); *G06F 16/285* (2019.01); *G06F 16/84* (2019.01)

(58) Field of Classification Search
CPC ................. G06F 17/30598; G06F 17/30867
See application file for complete search history.

(56) References Cited

U.S. PATENT DOCUMENTS 8,769,692 B1 * 7/2014 Muttik ............... H04L 63/1416
726/22
8,862,580 B1 * 10/2014 Emigh .................. G06F 16/353
707/731

(Continued)

OTHER PUBLICATIONS

Article entitled "A Sampling-based Data Filtering Scheme for Reducing Energy Consumption in Wireless Sensor Networks", by Hong et al., dated 2011.*

(Continued)

*Primary Examiner* — Mahesh H Dwivedi
(74) *Attorney, Agent, or Firm* — Leydig, Voit & Mayer, Ltd.

(57) ABSTRACT

A method for managing data in a system includes a data filtering. Value information is quantized for each of one or more different filters according to a Quality of Information (QoI) assessment of data and related to a corresponding one of the filters. Data amount filtering information is determined for each of the value information indicating an amount of information to be filtered. Filter information is provided for each of the filters being used for filtering, the filter information including the determined data amount filtering information and category assignment information, wherein the category assignment information indicates an assignment of a respective one of the filters to a respective one of a plurality of predefined, appropriate data categories. Current importance category information is provided for at least one of the data categories and a common calculation procedure is applied for the filters.

14 Claims, 6 Drawing Sheets

(51) Int. Cl.
G06F 16/21 (2019.01)
G06F 16/84 (2019.01)
G06F 16/28 (2019.01)

(56) References Cited

U.S. PATENT DOCUMENTS

| | | | | |
|---|---|---|---|---|
| 2004/0001498 | A1* | 1/2004 | Chen | H04L 67/28 370/401 |
| 2005/0015454 | A1* | 1/2005 | Goodman | H04L 51/12 709/207 |
| 2005/0228783 | A1* | 10/2005 | Shanahan | G06F 16/3347 |
| 2010/0257249 | A1* | 10/2010 | May | H04L 51/12 709/206 |
| 2011/0179020 | A1* | 7/2011 | Ozzie | G06F 16/958 707/723 |
| 2013/0024425 | A1* | 1/2013 | Huang | G06F 16/16 707/650 |
| 2013/0041901 | A1* | 2/2013 | Nikankin | G06F 16/958 707/737 |
| 2015/0046532 | A1* | 2/2015 | Szczytowski | G06F 11/3086 709/204 |
| 2017/0061007 | A1* | 3/2017 | Ezzat | H04L 67/28 |

OTHER PUBLICATIONS

Eduardo F. Nakamura: "Information fusion for wireless sensor networks: Methods, models, and classifications", Aug. 9, 2007 (Aug. 9, 2007), XP002727440, Retrieved from the Internet: URL: http:f/delivery.acm.org/10.1145/127000 I0/1267073ja9-nakamura. pdf?ip=145.64.134.24 II I2&id=1267073&acc=Active%20SERVICE &key=E80E9EB78FFDF9DF%2E4D4702B0C3E38B35% 2E4D4702B0C3E38B35%2E4D4702B0C3E38B35&CFID= 514204820&CFTOKEN=65108903& a em =1405606224 318f63b23adff257fdff3c690082T277.

Claudio M De Farias et al: "Information fusion techniques applied to Shared Sensor and Actuator Networks", Local Computer Networks (LCN), 2012 IEEE 37$^{th}$ Conference on, IEEE, Oct. 22, 2012 (Oct. 22, 2012), pp. 188-191, XP032321432.

Papageorgiou Apostolos et al: "Smart M2M Data Filtering Using Domain-Specific Thresholds in Domain-Agnostic Platforms", 2013 IEEE International Congress on Big Data, IEEE, Jun. 27, 2013 (Jun. 27, 2013), pp. 286-293, XP032481279.

Alexandros Labrindis, et al., "Challenges and opportunities with big data", Proceedings of the VLDB Endowment, vol. 5, No. 12, pp. 2032-2033, Aug. 2012.

Maira Gatti, et al., "Domain-Independent Data Validation and Content Assistance as a Service", 2012 IEEE 19$^{th}$ International Conference on Web Services, pp. 405-414, Jun. 2012.

Juha K. Laurila, et al., "The Mobile Data Challenge: Big Data for Mobile Computing Research", Conference: Mobile Data Challenge by Nokia Workshop, in conjunction with Int. Conf. on Pervasive Computing, pp. 1-8, Jan. 2012.

Zhengzhang Chen, et al., "Discovery of extreme events-related communities in contrasting groups of physical system networks", Data Min Knowl Disc (2013), vol. 27, pp. 225-258, Sep. 1, 2012.

James Manyika, et al., "Bid data: The next frontier for innovation, competition, and productivity", McKinsey Global Institute, pp. 1-20, May 2011.

Naohisa Matsuda, et al., "Development of the M2M Service Platform", NEC Technical Journal, vol. 6, No. 4, pp. 19-24, Apr. 2011.

Geng Wu, et al., ""M2M: From Mobile to Embedded Internet", IEEE Communications Magazine", pp. 36-43, Apr. 2011.

Siok Kheng Tan, et al., "M2M Communications in the Smart Grid: Applications, Standards, Enabling Technologies, and Research Challenges", International Journal of Digital Multimedia Broadcasting, vol. 2011, pp. 1-8, May 26, 2011.

Emmanuel Darmois, et al., "Introduction to M2M", M2M Communications: A Systems Approach, First Edition, pp. 1-20, Dec. 2012.

Ericsson, "More than 50 Billion Devices", Ericsson White Paper, No. 284 23-3149, pp. 1-12, Dec. 2011.

UMTS Forum Report 44, WMobile Traffic Forecasts 2010-2020 Report, IDATE, pp. 1-92, Jan. 2011.

Google developers, "Google Cloud Storage: Pricing and Support", pp. 1-14, Jan. 2013.

Sebastian Wahle, et al., "The OpenMTC Framework—M2M Solutions for Smart Cities and the Internet of Things", *2012 IEEE international Symposium on a World of Wireless, Mobile and Multimedia Networks (WoWMoM)*, pp. 1-3, Jun. 25-28, 2012.

Andreas Reinhardt, et al., "Lightweight Remote Procedure Calls for Wireless Sensor and Actuator Networks", Seventh IEEE International Workshop on Sensor Networks and Systems for Pervasive Computing, pp. 116-121, Dec. 2011.

Apostolos Papageourgiou, et al., "Lightweight Wireless Web Service Communication Through Enhanced Caching Mechanisms", 42 International Journal of Web Services Research, vol. 9, No. 2, pp. 42-68, Apr.-Jun. 2012.

Oleksandr Mylyy, "RFID Data Management, Aggregation and Filtering", pp. 1-18, Jan. 2005.

O. Wedin, et al., "Data Filtering Methods", EU Project, pp. 1-45, Nov. 30, 2008.

M. Anwar Hossain, et al., „Modeling and Assessing Quality of Information in Multisensor Multimedia Monitoring Systems, ACM Transactions on Multimedia Computing, Communications and Applications, vol. 7, No. 1, article 3, pp. 3:02-3:30, Jan. 2011.

Sebasitna Zoeller, et al., „Scoresheet.based Event Relevance Determination for Energy Efficiency in Wireless Sensor Networks!, Proceedings of the 36$^{th}$ IEEE Conference on Local Computer Networks (LCN), pp. 207-210, Oct. 2011.

Besiki Stvilla, et al., "A Framework for Information Quality Assessment", JASIST, vol. 58, No. 12, pp. 1720-1733, Dec. 2007.

David Chu, et al., "Balancing Energy, Latency and Accuracy for Mobile Sensor Data Classification", SenSys' 11, pp. 1-14, Nov. 1-4, 2011.

* cited by examiner $R = [r_1, r_2...r_n], r_i = (c_i, w_i), c \in \mathbb{N}, w \in \mathbb{R}, 0 \leq w \leq 1.$ $R$: Set of requirements $r$, each of them being a category-weight pair.
$c_i$: An integer corresponding to a category (or type) of M2M data. (range and mapping rules are ontology- and implementation-specific)
$w_i$: A real between 0 and 1 providing the weight of a categroy. (i.e., $w_i \times 100\%$ of the data -the most important- shall be stored)

$F = [f_1, f_2...f_m], f_i = (q_i, c_{q_i}, t_i), t_i \in [0, t_{i_{max}}], t_i, c_{q_i} \in \mathbb{N},$ $F$: Set of filters $f$ implemented in the Filtering Module.
$q_i$: Function used by $f_i$ for QoI calculation, implementation-specific. (Any logic; $q_i(data)$ returns a value in the range $[0, q_{i_{max}}]$)
$c_{q_i}$: An integer corresponding to the category of data $f_i$ is used for.
$t_i$: Current threshold for $f_i$; data mapped by $q_i$ below it are filtered.

Fig. 5

```
// Input:  R (set of requirements)
// Output: T (list of thresholds)

for i = 0 to m
    for j = 0 to n
        if c_{q_i} = c_j
            t_i = \lfloor ((1 - w_i) * t_{i_{max}}) \rfloor
            T.add(t_i)
        end if
    end for
end for
return T
```

Fig. 6

METHOD AND SYSTEM FOR MANAGING DATA

CROSS REFERENCE TO RELATED APPLICATIONS

This application is a U.S. National Stage Application under 35 U.S.C. § 371 of International Application No. PCT/EP2014/056574 filed on Apr. 2, 2014, and claims benefit to European Patent Application No. 13161988.4 filed on Apr. 2, 2013. The International Application was published in English on Oct. 9, 2014 as WO 2014/161874 A1 under PCT Article 21(2).

FIELD

The present invention relates to a method for managing data in a system, for example M2M data in a M2M system, for managing M2M data, and in particular, to a method for managing data in a system comprising one or more devices communicating with one or more users via a network, wherein a data filtering according to one or more different filters is performed within the communication path from said devices to said users.

The present invention further relates to a system for managing data, for example M2M data in a M2M system, for managing M2M data, and in particular to a system for managing data comprising one or more devices communicating with one or more users via a network and to filtering modules therein. The present invention further relates to a filtering module.

BACKGROUND

Conventional filtering techniques or related techniques that could be used for filtering of M2M data can be assigned to one of the following three categories: The first category is related to general-purpose filtering and aggregation methods which perform removal or aggregation of duplicate data, erroneous data, outliers, etc. as it is shown for example in the non-patent literature of O. Mylyy, "RFID Data Management, Aggregation and Filtering," 2008, Hasso Plattner Institute Publications, Seminar on RFID Technology or of O. Wedin, J. Bogren, and I. Grabec, "Data Filtering Methods," 2008, EU Project Deliverable, Roadidea 215455.

In the second category quality of information QoI assessment methods are subsumed which may be domain-specific, score sheet-based, etc. for evaluating how much information is contained in a data set or how important this information is. In the non-patent literature of M. A. Hossain, P. K. Atrey, and A. El-Saddik, "Modeling and Assessing Quality of Information in Multisensor Multimedia Monitoring Systems," ACM Transactions on Multimedia Computing, Communications and Applications (TOMCCAP), vol. 7, no. 1, pp. 3:1-3:30, 2011 algorithms are disclosed for evaluating the importance of captured multimedia content. In the further non-patent literature of S. Zöller, A. Reinhardt, S. Schulte, and R. Steinmetz, "Scoresheet-based Event Relevance Determination for Energy Efficiency in Wireless Sensor Networks," in IEEE Conference on Local Computer Networks (LCN). EDAS Conference Services, 2011, pp. 207-210 an assessment and filtering of sensor readings is disclosed based on score-sheets of a provider while in the non-patent literature of B. Stvilia, L. Gasser, M. B. Twidale, and L. C. Smith, "A Framework for Information Quality Assessment," Journal of the American Society for Information Science and Technology, vol. 58, no. 12, pp. 1720-1733, 2007 a general framework that can be customized for assessing quality of information in different use cases is shown.

In the third category filtering is conventionally performed based on a data classification. For example in the non-patent literature of D. Chu, N. D. Lane, T. T.-T. Lai, C. Pang, X. Meng, Q. Guo, F. Li, and F. Zhao, "Balancing Energy, Latency and Accuracy for Mobile Sensor Data Classification," in ACM Conference on Embedded Networked Sensor Systems (SenSys '11). ACM, 2011, pp. 54-67 and in the non-patent literature of M. Rahman, Y. Lazim, F. Mohamed, "Applying Rough Set Theory in Multimedia Data Classification", International Journal on New Computer Architectures and their Applications (IJNCAA), Vol. 1, No. 3, pages 683-693, The Society of Digital Information and Wireless Communications, 2011 standard machine learning techniques are disclosed in order to classify readings of different sensors like sound recordings, images or GPS series, into various different data categories. Certain data categories can then be forwarded while others are filtered.

SUMMARY

In an embodiment, the present invention provides a method for managing data in a system. The system includes one or more devices communicating with one or more users via a network. The method includes performing a data filtering according to one or more different filters within a communication path from the one or more devices to the one or more users, the data filtering being performed by: a) quantizing value information for each of the filters according to a Quality of Information (QoI) assessment of data and related to a corresponding one of the filters, b) determining data amount filtering information for each of the value information indicating an amount of information to be filtered, c) providing filter information for each of the filters being used for filtering, the filter information comprising the determined data amount filtering information and category assignment information, wherein the category assignment information indicates an assignment of a respective one of the filters to a respective one of a plurality of predefined, appropriate data categories, d) providing current importance category information for at least one of the plurality of data categories, and e) applying a common calculation procedure for the filters on all of the data amount filtering information for updating them to the current importance category information.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 5 shows definitions for a method and systems according to a third embodiment of the present invention; and FIG. 6 shows part of a method according to a fourth embodiment of the present invention.

DETAILED DESCRIPTION

Although applicable in general to any data and any system, the present invention will be described with regard to machine-to-machine data in a machine-to-machine system.

Figure 1:
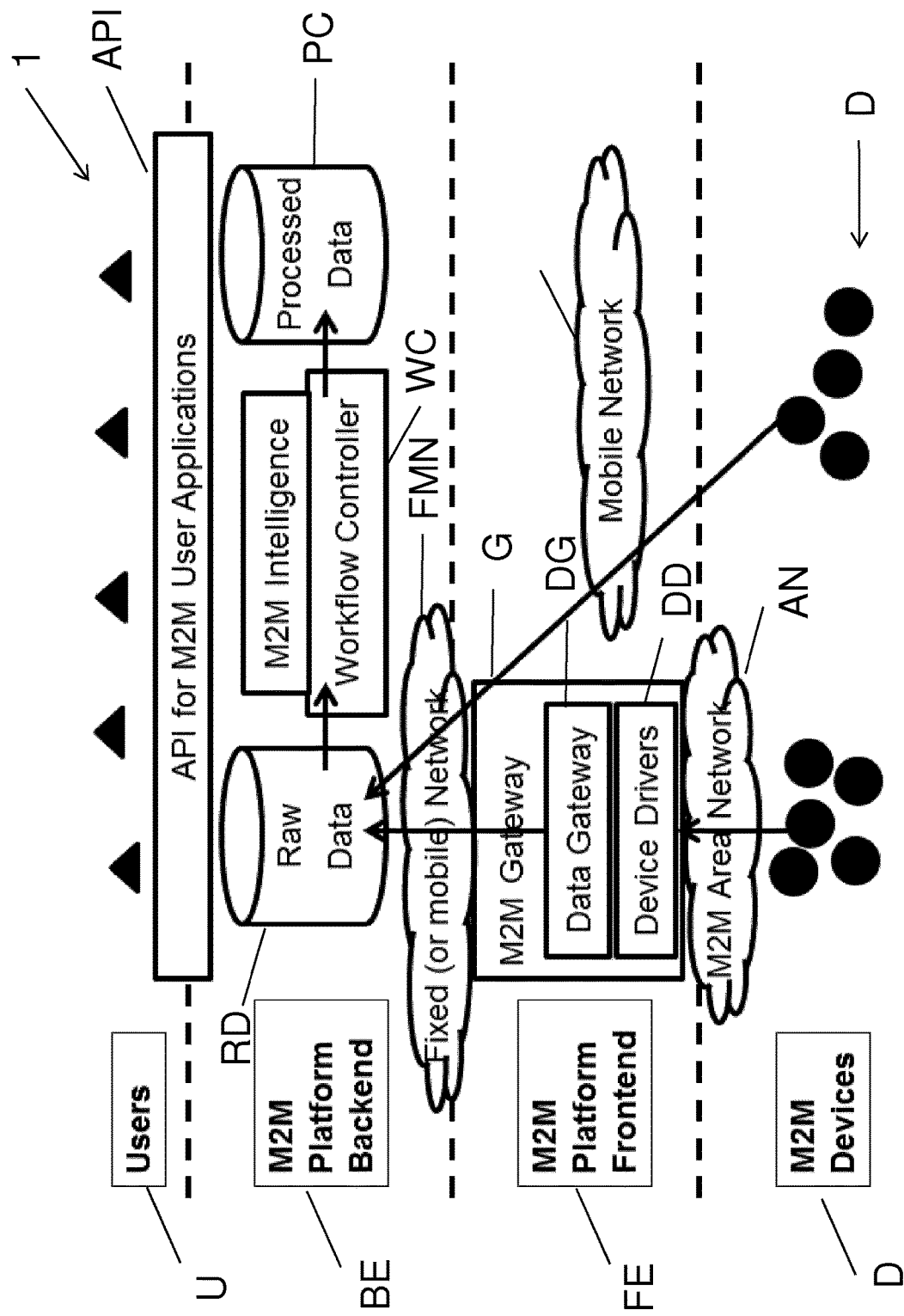
FIG. 1 shows a conventional machine-to-machine system.

FIG. 1 shows a conventional machine-to-machine system architecture. As depicted in FIG. 1 machine-to-machine (M2M) devices D communicate with M2M gateways G comprising data gateways DG and device drivers DD via a M2M area network AN for the data capturing, organizing and filtering of data before sending it to a M2M backend BE where the obtained raw data RD is stored, processed by an M2M intelligence WC to processed data PC and/or provided via a application programming interface API to users U of M2M applications, preferably homogenized and/or enriched.

As shown in FIG. 1 a common application programming interface API is located between all users U and the M2M backend BE enabling the development of various types of novel M2M applications without the need of reengineering the levels below the M2M backend BE.

However, a horizontal M2M platform shown by the dotted horizontal lines in FIG. 1 cannot directly dictate the lower levels what data to select or how to filter data, since their deployment phases are decoupled and no application is served by the horizontal M2M platform exclusively but it coexists with other M2M applications of different levels.

Figure 2:
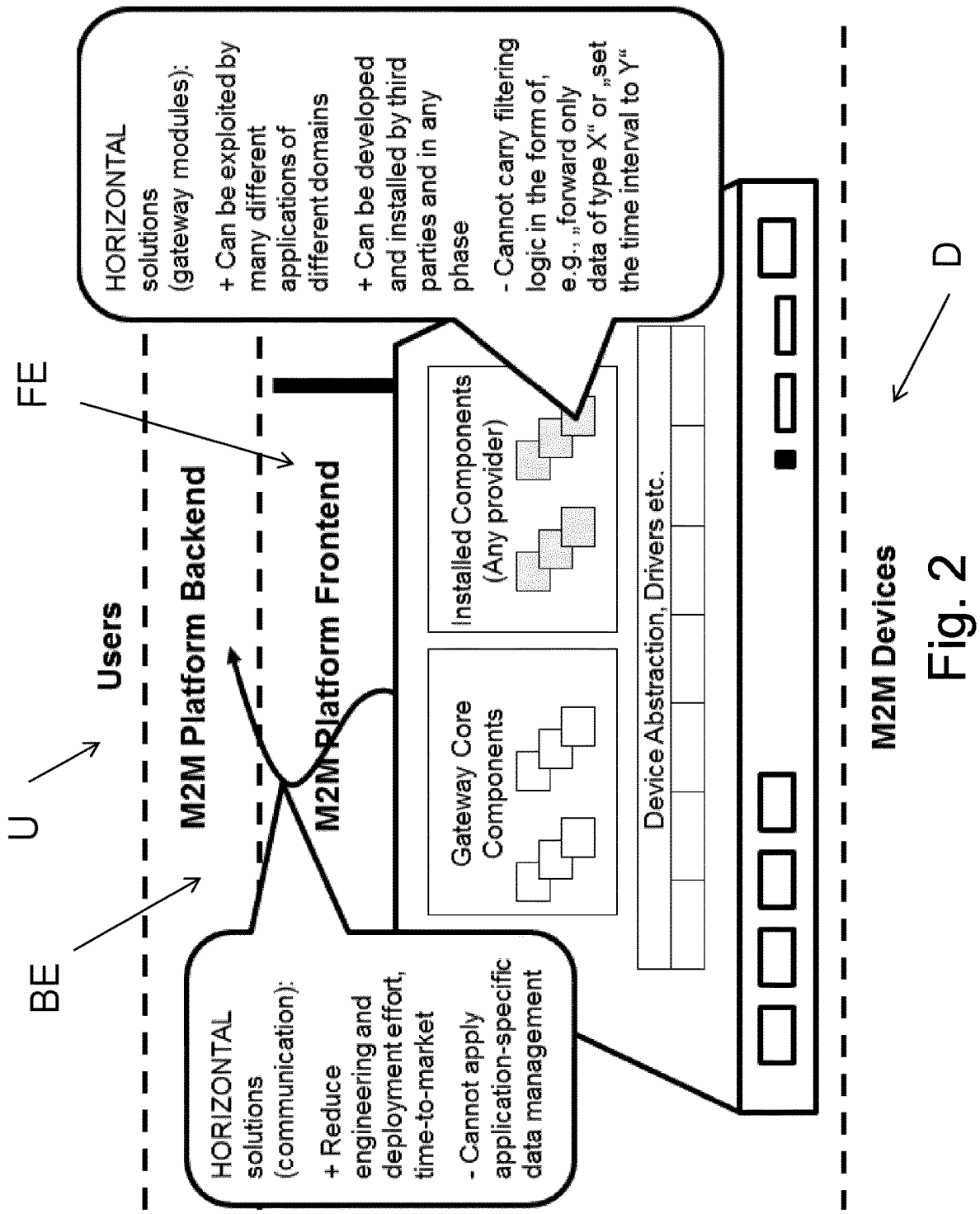
FIG. 2 shows a conventional system according to FIG. 1 in more detail.

In FIG. 2 the problem of filtering of data from M2M devices D to users U is shown in more detail. Conventionally, the M2M frontend FE comprises gateway core components and installed components which cannot carry filtering logic for filtering enabling filtering like "forward only data of type X" or "set the time interval for filtering to Y". Further a conventional M2M platform backend BE cannot apply application-specific data management, in particular filtering of the data.

One of the problems of the first category of conventional filtering techniques is that great portions of data cannot be filtered while those of the second and third categories of conventional filtering techniques rely on logic depending on characteristics of certain domains, for example data that is important for a medical application may not be important for a home automation application.

In an embodiment, the present invention provides a method and a system for managing data enabling an enhanced filtering, in particular a higher rate of filtered data, a higher accuracy in identifying important data and a higher ratio of load reduction compared with information loss.

In an embodiment, the present invention provides a method and a system for managing data enhancing flexibility, i.e. for allowing integration of any filtering function.

In an embodiment, the present invention provides a method and a system for managing data enabling guaranteed filtering enforcement.

In an embodiment, the present invention provides a method and a system for managing data enabling a simultaneous setting of arbitrarily many filters enhancing the efficiency of filter configurations.

In an embodiment, a method for managing data in a system, preferably M2M data in a M2M system, comprising one or more devices communicating with one or more users via a network, wherein a data filtering according to one or more different filters is performed within the communication path from said devices to said users is defined.

According to an embodiment, for data filtering, the following steps are performed:
a) Quantizing for each of said filters value information, preferably a range of values, according to a Quality of Information assessment of data and related to the corresponding filter,
b) Determining data amount filtering information, preferably in form of a threshold, for each value information indicating the amount of information to be filtered,
c) Providing filter information for each filter being used for filtering comprising the corresponding determined amount filtering information and category assignment information, wherein category assignment information indicates an assignment of a filter to a predefined, appropriate data category,
d) Providing current importance category information for one or more of the data categories, and
e) Applying a common calculation procedure for said filters on all amount filtering information for updating them to current importance category information.

According to an embodiment of the invention it has been recognized that for example a machine-to-machine platform operator or an autonomic module of a backend is enabled to perform filtering configurations, i.e. to enforce an appropriate and context-based selection of data and storing of data by comprising numerous multi-domain, possibly third party, modules and heterogeneous filters with their technical characteristics being unknown at the design time.

According to an embodiment of the invention it has been further recognized that forwarding of exact data amounts for example to the backend is enabled. If a backend wants to reduce the amount of data that it is receiving the requirements with which this can be achieved can be easily calculated even without knowing details of for example applications on gateways and the specific used filters.

According to an embodiment of the invention it has been even further recognized that an access control mechanism is enabled for data filtering ensuring that for example a platform operator can control a rate of the reported data without having to reject write request.

According to an embodiment of the invention it has been further recognized that filtering is greatly enhanced in particular with regard to the rate of filtered data, the accuracy in identifying important data and a higher load reduction/information loss ratio.

According to an embodiment of the invention it has been even further recognized that the efficiency is enhanced for filtering the data and controlling of the filtering since setting of arbitrarily many filters can be handled via a single operator's action.

According to a preferred embodiment in step a) a range of values is quantized creating one or more thresholds for each filter, preferably wherein the thresholds are mapped to integers. This enables definition of each filter with one or more thresholds so that a reliable filtering of the data is provided with easy-to-compare thresholds characterizing the corresponding filter. Since an arbitrary number of thresholds can be created a precise filtering of the data is enabled.

According to a further preferred embodiment step a) is performed such that the values returned by a quality of information assessment are uniformly mapped. This allows a fast and efficient quantization of the range of values. The distribution of returned quality of information values among the intervals/ranges between the thresholds can be easily performed.

According to a further preferred embodiment, data amount filtering information is provided in form of one or more self adjusting values, preferably one. This enables for example to easily define the data amount to be filtered and the filtering of the data based on a comparison with the one or more self adjusting values. The term "Self-adjusting value" preferably means that a value can be calculated locally, for example by a gateway logic of an M2M frontend.

According to a further preferred embodiment in step d) one or more sets of requirements indicating the weight of each data category is provided, preferably by an M2M backend to one or more M2M frontends. This enables to easily define the importance of data categories by using a set of requirements therefore allowing a fast and efficient filtering by the filters using said set of requirements for defining the filters. Further high-level or abstract rules for filtering may be defined and mapped or implemented to certain requirements resulting in a set of requirements applicable by the filters for filtering.

According to a further preferred embodiment upon capturing data for filtering the data is filtered and when the amount of data to be filtered matches the data amount filtering information passing information, preferably in form of a passkey, is included in and/or attached to the filtered data. For example if a threshold is exceeded a passkey is provided to the data gateway for sending this data to the backend. Conventionally a filtering module performing the filtering would forward the data to the backend. However, by using the data gateway to forward the filtered data a fast and efficient data forwarding of filtered data is enabled since the data gateway usually has components of many providers and therefore the filtered data can be efficiently forwarded. For example in case of critical data or data requested by a priority application a filter can be prepared such that the filter does not filter such data in any case. Further using a passkey allows to easily access for example a database with the passkey for storing the data, so that a gateway can only forward data for storing if a passkey is attached for accessing a database.

According to a further preferred embodiment filtering is performed on a M2M frontend, located between said devices and said users. Using an M2M frontend for performing the filtering enables in an efficient way to filter the data in an abstraction layer between the users and the devices.

According to a further preferred embodiment a set of requirements is provided in form of a data-category/weight-pair, preferably wherein a higher weight indicates a higher importance of the data category. This enables in an easy and efficient way to provide filter information for applying and defining the filter.

FIG. 1 shows a conventional machine-to-machine system. In FIG. 1 a common machine-to-machine system architecture 1 is shown which can serve as a high-level view of major implementation and reference architectures according to ETSI M2M or one M2M.

The M2M devices in FIG. 1 communicate with M2M gateways G comprising data gateways DG and device drivers DD which capture, organize and filter the information respectively the data before they send it to an M2M backend system BE where it is stored and provided to M2M applications, possibly homogenized and/or smartly enriched. Further in FIG. 1 the M2M devices D sent over an M2M area network AN data to an M2M platform frontend FE, in particular to the M2M gateway G. The M2M gateway G is connected via a fixed or mobile network FMN to the M2M platform backend BE capturing the raw data RD. The raw data RD may then processed by a M2M intelligence and a workflow controller WC resulting in processed data PC. The processed data PC may then provided via an API for M2M user applications to the users U. As shown in FIG. 1 a common application programming interface API is located between all users U and the M2M backend BE enabling the development of various types of novel M2M applications without the need of reengineering the levels below the M2M backend BE.

However, a horizontal M2M platform shown by the dotted horizontal lines cannot directly dictate the lower levels what data to select or how to filter data, since their deployment phases are decoupled and no application is served by the horizontal M2M platform exclusively but coexists with other M2M applications of different levels.

FIG. 2 shows a conventional system according to FIG. 1 in more detail. In FIG. 2 it is shown that appropriate data selection and filtering is necessary in order to enhance bandwidth consumption, storage costs and system stability. However, as already described, conventionally the M2M platform backend BE and frontend FE comprising gateway core components and installed components cannot handle the dataflow from the frontend FE to the backend BE specifically for each application and for example installed components of third parties cannot carry filtering logic in the form of "forward only data of type X" or "set the time interval to Y".

Figure 3:
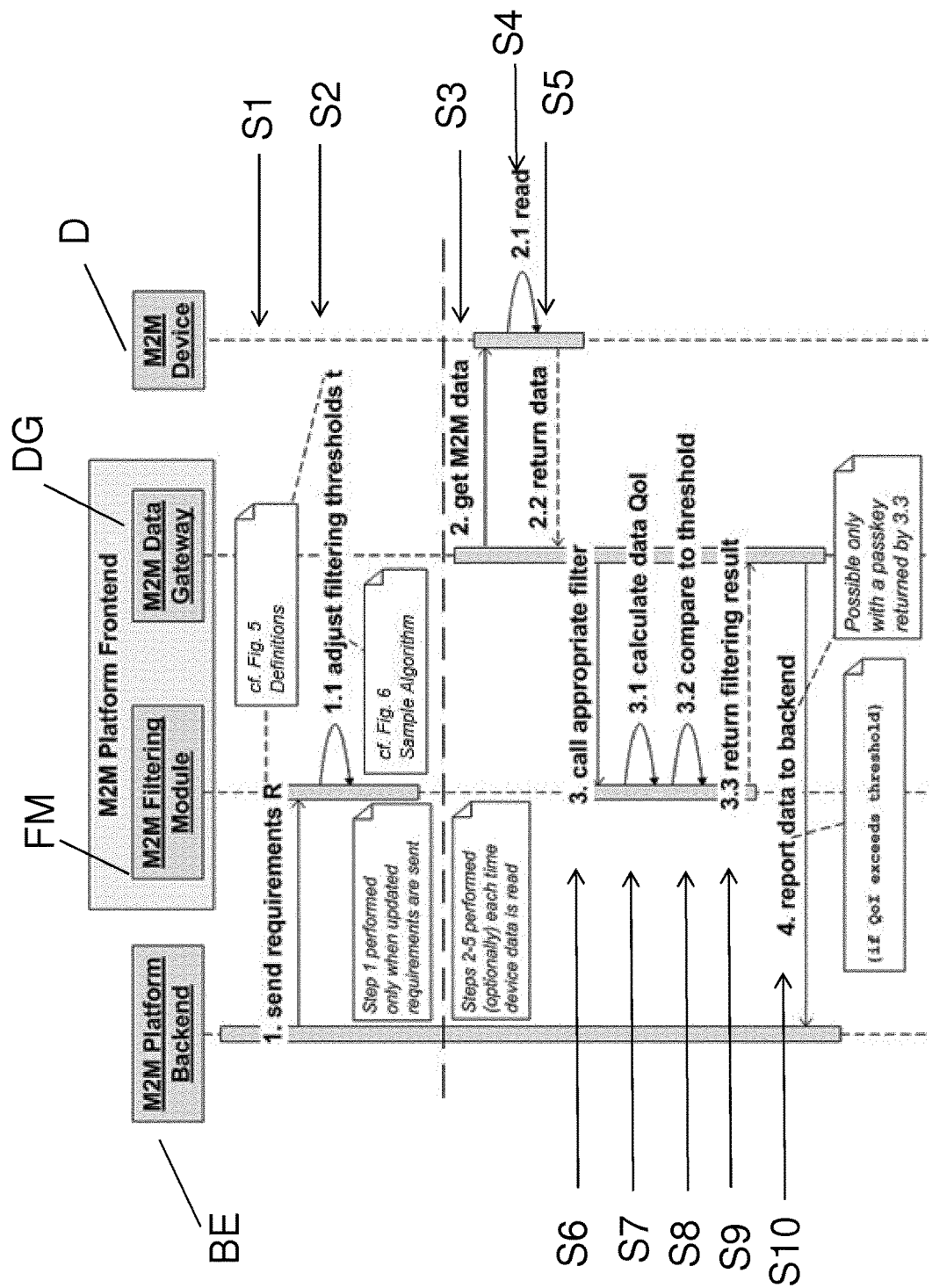
FIG. 3 shows a method according to a first embodiment of the present invention.

FIG. 3 shows a method according to a first embodiment of the present invention. In FIG. 3 an M2M platform backend BE sends in a first step S1 requirements R to a M2M platform frontend FE, in particular to the M2M filtering module FM. The M2M filtering module FM adjusts the filtering thresholds $t_i$ in a second step S2. The steps S1 and S2 are only performed when updated requirements R are sent. Updated requirements may be sent in total or only the requirements or the parts which have changed.

The following steps S3-S10 are optionally performed each time M2M device data is read.

In a third step S3 the M2M data gateway DG initiates getting M2M data from the M2M device D.

The M2M device D reads the data in a fourth step S4 and returns the data in a fifth step S5 back to the M2M data gateway DG.

In a sixth step S6 upon receiving the returned data, the M2M data gateway DG calls for the appropriate filter in the M2M filtering module FM.

In a seventh step S7 the M2M filtering module calculates a value for the data quality of the received data/information and compares in an eighth step S8 the calculated quality of information value to one or more of the thresholds of the filter.

In an ninth step S9 the M2M filtering module FM returns the result to a M2M data gateway DG and in a tenth step S10 the M2M data gateway DG reports data to the backend BE if the quality of information exceeds the threshold and preferably accompanied with a passkey which may be also returned in the eighth step S8.

In detail and with regard to FIG. 3 the M2M filtering module FM can be implemented in different ways. For example the M2M filtering module FM may be a software library with extensions, standalone gateway application, OSGi bundle or the like. The M2M filtering module FM determines the filtering of M2M data being captured by other components of an M2M data gateway DG before being sent to an M2M backend BE.

The M2M filtering module FM is populated with implementation of various filters, wherein each of the filters data corresponding to a method for assessing the quality of information of particular kinds of data. The implementations of the various filters are preprocessed in the following way: For each filter $f_i$ a range of values returned by its quality of information assessment method $q_i$ creating one or more thresholds, wherein the number of thresholds is not limited. The thresholds may be mapped to integers in the range of [0, $t_{i,\ max}$] and thus $t_{i,\ max}+1$ thresholds exist in total for each filter $f_i$ while the current threshold is represented as $t_i$. The quantization is preferably performed in such a way that the distribution of the returned quality of information values among the ranges/intervals between the thresholds is expected to be approximately uniform.

Further for preprocessing each filter $f_i$ maintains configuration and status information keeping at least a self adjusting value $t_i$ as current threshold depending on backend requirements and which determines how much information should be filtered. Further a predefined value $c_{qi}$ assigning the filter $f_i$ to a category $c_i$ of M2M data it is appropriated for. The categories $c_q$ can be defined in a M2M-related ontology regarding domains and applications.

All current thresholds $t_i$ are preferably being constantly adjusted to context-depended values with a common procedure and common algorithms despite the heterogeneity according to the following steps: A set R of requirements $r_i$ is sent for example by the M2M backend BE to one or more M2M frontends FE indicating the current important/weight $w_i$ of each M2M category $c_i$. Further a calculation of new thresholds $t_i$ for each filter $f_i$ of each gateway GW is performed according to a common algorithm such as the algorithm shown in FIG. 6: Said algorithm calculates a threshold that would filter a percentage of data as big as implied by the weight $w_i$ of the corresponding category and with the assumption of a uniform distribution of the Quality of Information values.

Therefore a common mechanism is used respectively applied for the coordination of heterogeneous filters $f_i$ wherein heterogeneous in this context means that filters $f_i$ may have different quality of information assessment methods, different value ranges, different amounts of thresholds, different domains of applications and/or the like. This is enabled due to the steps described previously.

The calculated current thresholds $t_i$ are kept and used until new requirements $r_i$ come from the M2M backend BE or its operator.

At the decision time, i.e. each time actual data is captured and sent or filtered, the M2M data gateway DG calls an appropriate filter of the M2M filtering module FM passing it the data. To choose the appropriate filter the M2M data gateway DG can look at the category of the filter's function, i.e. the parameter $c_{qi}$ here. The filter $f_i$ then performs the actions defined, i.e. quality of information assessment, value transformations, comparison to current threshold for the data, etc. and may meet a "forward of filter" decision.

If the threshold is exceeded, the M2M filtering module FM then may send a passkey to the M2M data gateway DG for initiating a sending of this data to the M2M backend BE. In case of critical data or data requested by a priority M2M application the filter $f_i$ may be easily set to not filter such data in any case.

Figure 4:
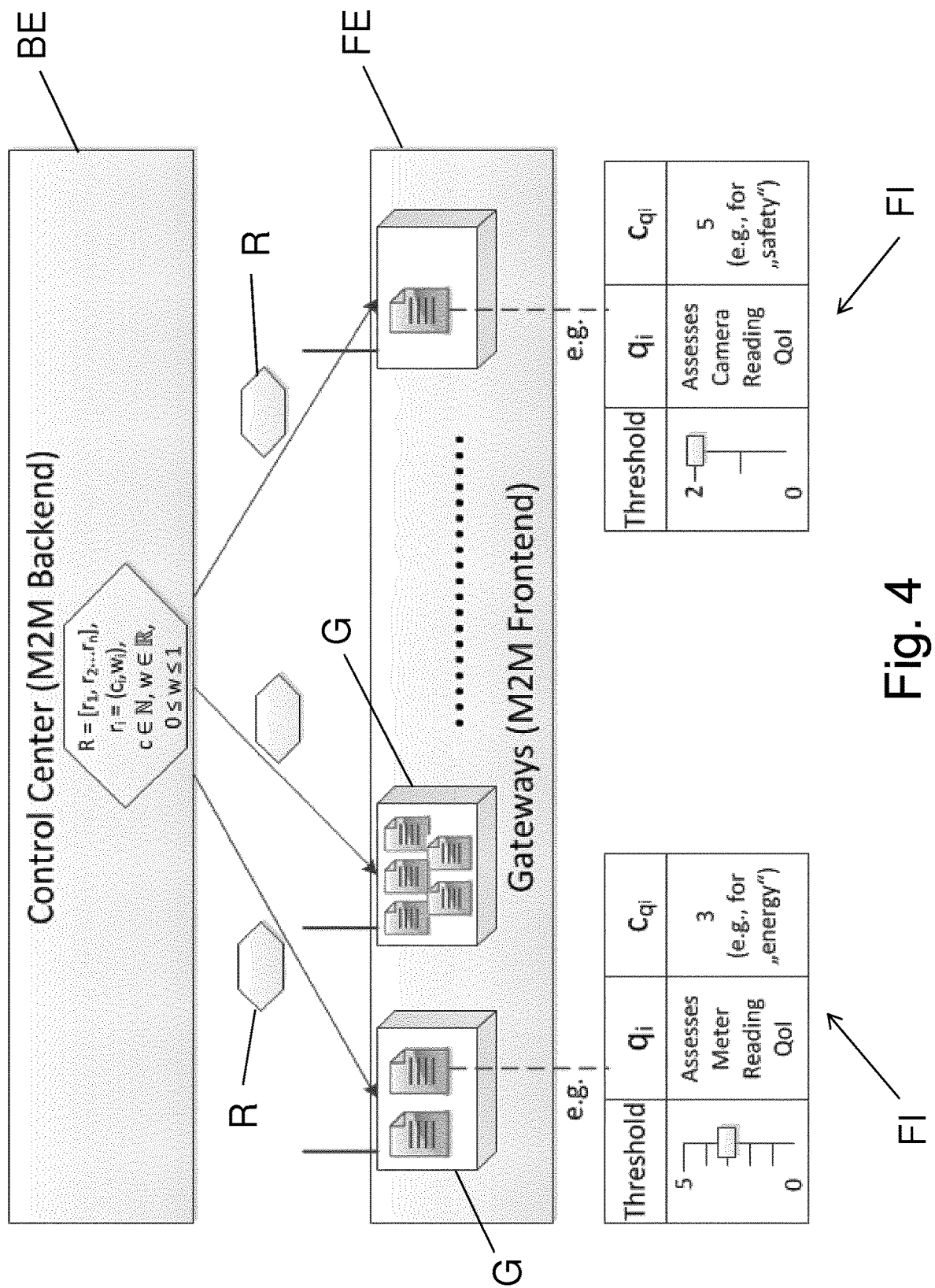
FIG. 4 shows part of a system according to a second embodiment of the present invention.

FIG. 4 shows part of a system according to a second embodiment of the present invention.

In FIG. 4 in detail a parallel self-adjustment of heterogeneous filters with single requirement updates is shown. Different updates may be sent to different gateways G or groups of gateways G. Therefore FIG. 4 visualizes that an automatic setting of arbitrarily many heterogeneous filter configurations is enabled by a single requirement update of an operator via the control center or M2M backend BE. The requirements R are provided to the different gateways G located in the M2M frontend FE. The gateway G comprises a plurality of filter modules FM which are equipped with filter information FI as described above like threshold $t_i$, a quality of information value $q_i$ and an assigned category of the data $c_{qi}$. This filter information FI is provided for every filter module FM.

The requirements R for each of the filters $f_i$ comprise category weight-pairs $r_i=(c_i, w_i)$, wherein $c_i$ denotes the category of the data and $w_i$ denotes the importance or weight of the data. Of course $w_i$ is between 0 and 1. The filters $f_i$ may reside on many gateways G while the backend BE may send either the same requirements R to many gateways G or different requirements for and to each of them.

FIG. 5 shows definitions for a method and systems according to a third embodiment of the present invention.

In FIG. 5 definitions are shown for the set of requirements R and the set of filters F: Each requirement $r_i$ comprises a category weight-pair $c_i$, $w_i$, wherein $c_i$ denotes an integer corresponding to a category or type of M2M data, wherein the range of the value and the mapping rules for the category are ontology and/or implementation specific. The value $w_i$ is a real value between 0 and 1 providing the weight of a data category, i.e. $w_i \times 100\%$ of the data the most important shall be stored.

The set of filters F is implemented in the filtering module FM and each filter $f_i$ comprises a triple with a function used by the filter $f_i$ for a quality of information calculation $q_i$. For the function $q_i$ any logic may be used and the function $q_i$ returns when applied on data a value in the range of [0, $q_{i,\ max}$]. $c_{qi}$ may be an integer corresponding to the category of the data the filter $f_i$ is used for and $t_i$ denotes the current threshold for the filter $f_i$, wherein data mapped by the function $q_i$ below is filtered. The set of requirements R and the set of filters F represent the filtering information FI for the filters.

FIG. 6 shows part of a method according to a fourth embodiment of the present invention.

In FIG. 6 is an example for an algorithm for a threshold adjustment shown. As input the set of requirements R is used and as output a list of thresholds T is obtained. The variables are defined in FIG. 5.

In summary the present invention provides a system and a method for managing, preferably assessing and forwarding or filtering of M2M data, for example collected from sensor devices. The system may be assembled by multiple distributed entities, so-called filtering modules FM which may reside on data collection gateways and comprise a collection of heterogeneous filters and which can communicate with a control infrastructure over any type of communication network enabling a unified handling of different data filter components for different data consumers, for example different industry sectors and applications.

Further the present invention in particular provides interacting modules and a flow of actions unifying the handling of heterogeneous filters by specifying that the heterogeneous filters are prepossessed and described according to embodiments of a method according to the invention with the proposed common definition, i.e. defining possible thresholds and M2M data categories.

Even further the present invention enables a separation of the filtering configuration from other filtering actions enabling to perform it at the frontend FE based on requirements R provided by the backend BE and which do not include any filter dependent details such as the desired filtering thresholds $t_f$.

The present invention further provides a filter independent method for adjusting filtering thresholds of heterogeneous filters in particular based on M2M specific data categorization and M2M specific requirements. The present invention enables a system to be provided for performing threshold adjustment automatically based on that filters operate based on quality of information assessment of the data, i.e. based on an evaluation of the importance of the data enabling support of any quality of information assessment method. Further the filtering thresholds $t_f$ are preferably defined in a way that the uniform distribution of the data quality of information assessment result is enabled.

The present invention enables an employment of an access control mechanism and a context of data filtering to ensure that a platform operator may control the rate of the reported data without having to blindly reject write requests to a storage even when third party modules are deployed on the gateway respectively the M2M frontend FE.

Even further the present invention enables an M2M platform operator or an autonomic module of an M2M backend to perform filtering configurations preferably to enforce an appropriate and context-based selection and storing of M2M data in a technical landscape which may not permitted otherwise because it may consist of numerous multi-domain and/or third-party modules and heterogeneous filters, wherein the technical characteristics of the filters are unknown the design or setup time.

The present invention is in particular suitable for achieving and forwarding of exact amounts of data to a backend preferably because of the rules and the characteristics for example the use of weights representing ratios, the uniformity of threshold intervals and a centralized preference setting. For example if a backend wants to reduce the amount of data that it is receiving by X % the requirements for updating can be easily calculated even without knowing the details of the gateway applications and the used filters.

In summary the present invention provides inter alia the following advantages: The present invention enables an integration of any filtering function enabling better filtering results than conventional solutions. Better filtering means a higher rate of filter data and/or a higher accuracy in identifying important data and/or a higher ratio of load reduction compared with information loss.

Another advantage is that a guaranteed filtering enforcement is provided through the independency of a M2M filtering module and an access control mechanism. Further the present invention enables a simultaneous setting of arbitrarily many filters with a single operator's action. This enables an efficient operation because the efficiency of configuring the filters can become much bigger compared to conventional solutions where the configuration needs to be performed separately on every single gateway.

Many modifications and other embodiments of the invention set forth herein will come to mind the one skilled in the art to which the invention pertains having the benefit of the teachings presented in the foregoing description and the associated drawings. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for managing data in a machine-to-machine (M2M) system, the M2M system including a plurality of devices communicating with an M2M backend (BE), the method comprising:
performing, by an M2M frontend (FE), data filtering, wherein the M2M FE includes a plurality of filters and is disposed in a communication path from the plurality of devices to the M2M BE, and wherein the data filtering is performed by:
a) calculating, for each of the plurality of filters, a threshold Quality of Information (QoI) value,
b) receiving, from one of the plurality of devices, M2M data of a particular category,
c) selecting a filter corresponding to the category of the received M2M data,
d) applying a filtering function of the selected filter to the received M2M data so as to provide a forwarding decision for the received M2M data, and
e) performing, based on the forwarding decision, forwarding the received M2M data to the M2M BE or discarding the received M2M data,
wherein each of the plurality of filters of the M2M FE provides a QoI assessment method, wherein each of the plurality of filters has a different QoI assessment method, a different calculated threshold QoI value, and a different number of thresholds.

2. The method according to claim 1, wherein the calculating, for each of the plurality of filters, a threshold QoI value is performed using a weighting that specifies a weight for each of the plurality of filters.

3. The method according to claim 2, wherein the weighting is received by the M2M FE from the M2M BE.

4. The method according to claim 1, wherein each threshold QoI value is a self-adjusting value.

5. The method according to claim 1, further comprising receiving, by the M2M FE from the M2M BE, a set of requirements, wherein the set of requirements specifies, for each of a plurality of M2M data categories, a weight for data of the respective M2M data category.

6. The method according to claim 1, wherein the forwarding decision for the received M2M data is based on a comparison of a QoI value calculated for the received M2M data and the threshold QoI value for the selected filter.

7. The method according to claim 6, wherein the QoI value calculated for the received M2M data is calculated by the selected filter.

8. The method according to claim 5, wherein at least one of the requirements of the set of requirements is provided as a data-category/weight pair $r_i=(c_i, w_i)$.

9. The method according to claim 1, wherein the applying a filtering function of the selected filter to the received M2M data so as to provide a forwarding decision for the received M2M data includes:
- calculating, based on a respective QoI assessment method provided by the selected filter, a QoI value for the received M2M data, and
- comparing the QoI value calculated for the received M2M data and a respective threshold QoI calculated for the selected filter.

10. The method according to claim 9, wherein the respective QoI assessment method provided by the selected filter specifies QoI values for M2M data of the category of the received M2M data that is approximately uniformly distributed over between a plurality of thresholds.

11. The method according to claim 10, wherein calculating, for the selected filter, a respective threshold QoI value determines a percentage of M2M data of the category of the received M2M data that is to be forwarded to the M2M BE and a corresponding percentage of M2M data of the category of the received M2M data that is to be discarded.

12. The method according to claim 5, wherein each respective weight specified for data of each of the plurality of M2M data categories represents a ratio of received M2M data to be forwarded to received M2M data to be discarded.

13. An M2M frontend (FE), comprising:
- one or more processors that collectively provide a plurality of filtering modules, each of the filtering modules configured to implement one or more of a plurality of filters so as to perform data filtering by:
  a) calculating, for each of the plurality of filters, a threshold Quality of Information (QoI) value,
  b) receiving, from one of a plurality of devices, M2M data of a particular category,
  c) selecting a filter corresponding to the category of the received M2M data,
  d) applying a filtering function of the selected filter to the received M2M data so as to provide a forwarding decision for the received M2M data, and
  e) performing, based on the forwarding decision, forwarding the received M2M data to an M2M backend (BE) or discarding the received M2M data,
- wherein each of the plurality of filters of the M2M FE provides a QoI assessment method, wherein each of the plurality of filters has a different QoI assessment method, a different calculated threshold QoI value, and a different number of thresholds.

14. A machine-to-machine (M2M) system, comprising:
- an M2M backend (BE);
- one or more devices configured to communicate with the M2M BE via an M2M frontend (FE); and
- the M2M frontend, including one or more processors that collectively provide a plurality of filtering modules, each of the filtering modules configured to implement one or more of a plurality of filters so as to perform data filtering by:
  a) calculating, for each of the plurality of filters, a threshold Quality of Information (QoI) value,
  b) receiving, from one of the plurality of devices, M2M data of a particular category,
  c) selecting a filter corresponding to the category of the received M2M data,
  d) applying a filtering function of the selected filter to the received M2M data so as to provide a forwarding decision for the received M2M data, and
  e) performing, based on the forwarding decision, forwarding the received M2M data to the M2M backend (BE) or discarding the received M2M data,
- wherein each of the plurality of filters of the M2M FE provides a QoI assessment method, wherein each of the plurality of filters has a different QoI assessment method, a different calculated threshold QoI value, and a different number of thresholds.

\* \* \* \* \*